(12) United States Patent
Harrop et al.

(10) Patent No.: US 10,533,684 B2
(45) Date of Patent: Jan. 14, 2020

(54) CLAMP ASSEMBLY

(71) Applicant: Advanced Insulation Limited, Gloucester, Gloucestershire (GB)

(72) Inventors: Martin Steven Harrop, Gloucester (GB); Radcliffe Lewis, Gloucester (GB); Stewart Ian Morley, Gloucester (GB)

(73) Assignee: ADVANCED INSULATION LIMITED (GB)

( * ) Notice: Subject to any disclaimer, the term of this patent is extended or adjusted under 35 U.S.C. 154(b) by 0 days.

(21) Appl. No.: 15/756,308

(22) PCT Filed: Aug. 16, 2016

(86) PCT No.: PCT/GB2016/052529
§ 371 (c)(1),
(2) Date: Feb. 28, 2018

(87) PCT Pub. No.: WO2017/037417
PCT Pub. Date: Mar. 9, 2017

(65) Prior Publication Data
US 2018/0252334 A1    Sep. 6, 2018

(30) Foreign Application Priority Data

Aug. 28, 2015 (GB) .................................. 1515320.8

(51) Int. Cl.
*E21B 17/01* (2006.01)
*F16L 1/24* (2006.01)
*F16B 2/06* (2006.01)

(52) U.S. Cl.
CPC ................ *F16L 1/24* (2013.01); *F16B 2/065* (2013.01); *E21B 17/012* (2013.01)

(58) Field of Classification Search
CPC .. F16L 1/24; F16B 2/065; E21B 17/01; E21B 17/012
See application file for complete search history.

(56) References Cited

U.S. PATENT DOCUMENTS 4,497,593 A * 2/1985 Kramer ................. E02B 17/003
114/219
6,270,387 B1 * 8/2001 Nesheim ................... F16L 1/24
405/211

(Continued)

FOREIGN PATENT DOCUMENTS

GB      2288205 A    10/1995
GB      2459553 A    11/2009

(Continued)

OTHER PUBLICATIONS

Search Report and Written Opinion for corresponding International Application No. PCT/GB2016/052529, dated Oct. 11, 2016.

*Primary Examiner* — Stephen P Avila
(74) *Attorney, Agent, or Firm* — Tarolli, Sundheim, Covell & Tummino LLP

(57) ABSTRACT

A clamping arrangement 10 of a buoyancy clamp assembly. The arrangement 10 includes three identical arcuate members 12 engageable together to define a ring. Each of the arcuate members 12 has three discrete resilient members 14 engageable on for instance a pipe 68. Engagement members 42 are provided extendable between adjacent pair of arcuate members 12 to prevent relative twisting of adjacent arcuate members 12.

20 Claims, 26 Drawing Sheets

(56) References Cited

U.S. PATENT DOCUMENTS

| | | | |
|---|---|---|---|
| 7,744,314 B2 * | 6/2010 | Eide | E21B 17/012 166/350 |
| 2015/0068759 A1 * | 3/2015 | Harbison | E21B 17/012 166/350 |

FOREIGN PATENT DOCUMENTS

| | | |
|---|---|---|
| WO | 9827373 A1 | 6/1998 |
| WO | 2013171521 A2 | 11/2013 |

* cited by examiner

CLAMP ASSEMBLY

RELATED APPLICATIONS

The present invention is a U.S. National Stage under 35 USC 371 patent application, claiming priority to Serial No. PCT/GB2016/052529, filed on 16 Aug. 2016; which claims priority of GB 1515320.8, filed on 28 Aug. 2015, the entirety of both of which are incorporated herein by reference.

This invention concerns a buoyancy clamp assembly, and particularly but not exclusively a buoyancy clamp assembly mountable around a subsea pipe.

In a number of instances it is required to provide a buoyancy clamp assembly on subsea pipes. In particular it may be required to provide a buoyancy clamp assembly on pipes used in subsea hydrocarbon extraction, and in particular subsea risers and umbilicals, to reduce tension loads. Such subsea risers may extend between a subsea structure and a surface vessel or platform.

According to a first aspect of the invention there is provided a buoyancy clamp assembly, the clamp assembly including a clamping arrangement, which arrangement includes three or more profiled arcuate members engageable together to clamp onto a pipe, each of the arcuate members including a plurality of discrete resilient members on their inner faces which are deformably engageable against a pipe when the clamping arrangement is clamped onto the pipe, the discrete resilient members diverging in profile away from the arcuate members.

According to a second aspect of the invention there is provided a buoyancy clamp assembly, the clamp assembly including a clamping arrangement, which arrangement includes three or more profiled arcuate members engageable together to clamp onto a pipe, engagement members being provided extendable between adjacent arcuate members to prevent relative twisting of adjacent arcuate members.

Each of the arcuate members may be substantially identical to each other.

The discrete resilient members may diverge in profile in perpendicularly opposite directions.

The discrete resilient members may be elongate, and may have an axial longitudinal direction.

The discrete resilient members may diverge in both longitudinal and transverse directions.

The discrete resilient members may in a relaxed condition have a concave engagement face engageable with a pipe.

The discrete resilient members may have a hollow part, which part is locatable adjacent a respective arcuate member.

The discrete resilient members may be made of natural rubber, neoprene or a resilient plastics material.

Three or more discrete resilient members may be provided on each arcuate member.

The engagement members may be configured to permit relative pivotal movement between adjacent arcuate members.

The engagement members may include a pair of engagement parts, each engageable with a respective arcuate member, and a link member extending between the engagement parts.

The engagement parts may have a circular profile, and may rotatingly locate in respective circular profile openings in the arcuate members.

The engagement parts may snap fit in the respective openings in the arcuate members.

The engagement members may be made of rubber, or a resilient plastics material.

A pair of engagement members may be provided extending between each adjacent pair of arcuate members, and the engagement members may be provided on opposite radial faces of the arcuate members.

Fastening assemblies may be provided engageable between adjacent arcuate members.

The assembly may be configured such that when the arcuate members are brought into contact with each other by the respective fastening assemblies, sufficient compressive force will be applied by the discrete resilient members on to a pipe surrounded by the arcuate members to clamp the assembly onto the pipe.

Each fastening assembly may include an elongate member extending parallel to the axial direction in each arcuate member, with a fastening arrangement extendable between the elongate members on adjacent arcuate members. Alignable holes may be provided in the elongate members through which the fastening arrangement is extendable.

The fastening arrangement may include a threaded member which may be a bolt, with a nut or nuts engageable therewith.

The elongate members may rotatably locate in passages extendable through the arcuate members, and the passages at each end may provide the openings which locate the engagement member engagement parts. The engagement member engagement parts may be engageable with ends of the elongate members, and may help to retain the elongate members in the passages.

Outwardly open recesses may be provided in the outside of the arcuate members, which recesses locate respective fastening arrangements such that the fastening arrangements do not extend outwardly beyond the arcuate members.

Cover members may be provided to close off the recesses, and the cover members may snap fit on the openings to the recesses.

The buoyancy clamp assembly may include a plurality of axially adjacent clamping arrangements.

In one configuration the clamping arrangements are radially offset relative to each other, and may be offset by around 60°.

In another configuration, the clamping arrangements are radially aligned, with respective fastening assemblies adjacent each other. Common fastening assembly elongate members may be provided which extend through adjacent arcuate members, such that each elongate member forms part of multiple adjacent fastening assemblies.

The buoyancy clamp assembly may also include a buoyancy arrangement which is mountable on the clamping arrangement or arrangements. The buoyancy arrangement may be profiled to receive and surround a respective clamping arrangement or arrangements.

The buoyancy arrangement may include a hollow member which may be made of plastics material, which may be nylon. A filling may be provided in the hollow member, which filling may be a foamed material and may be a syntactic foam.

The buoyancy arrangement may include a plurality of hollow members engageable together around a clamping arrangement or arrangements, and a clamp member or members may be provided which surrounds the hollow member or members.

In one embodiment two hollow members are provided, which hollow members may be substantially identical.

Embodiments of the present invention will now be described by way of example only and with reference to the accompanying drawings, in which:—

Figure 1:
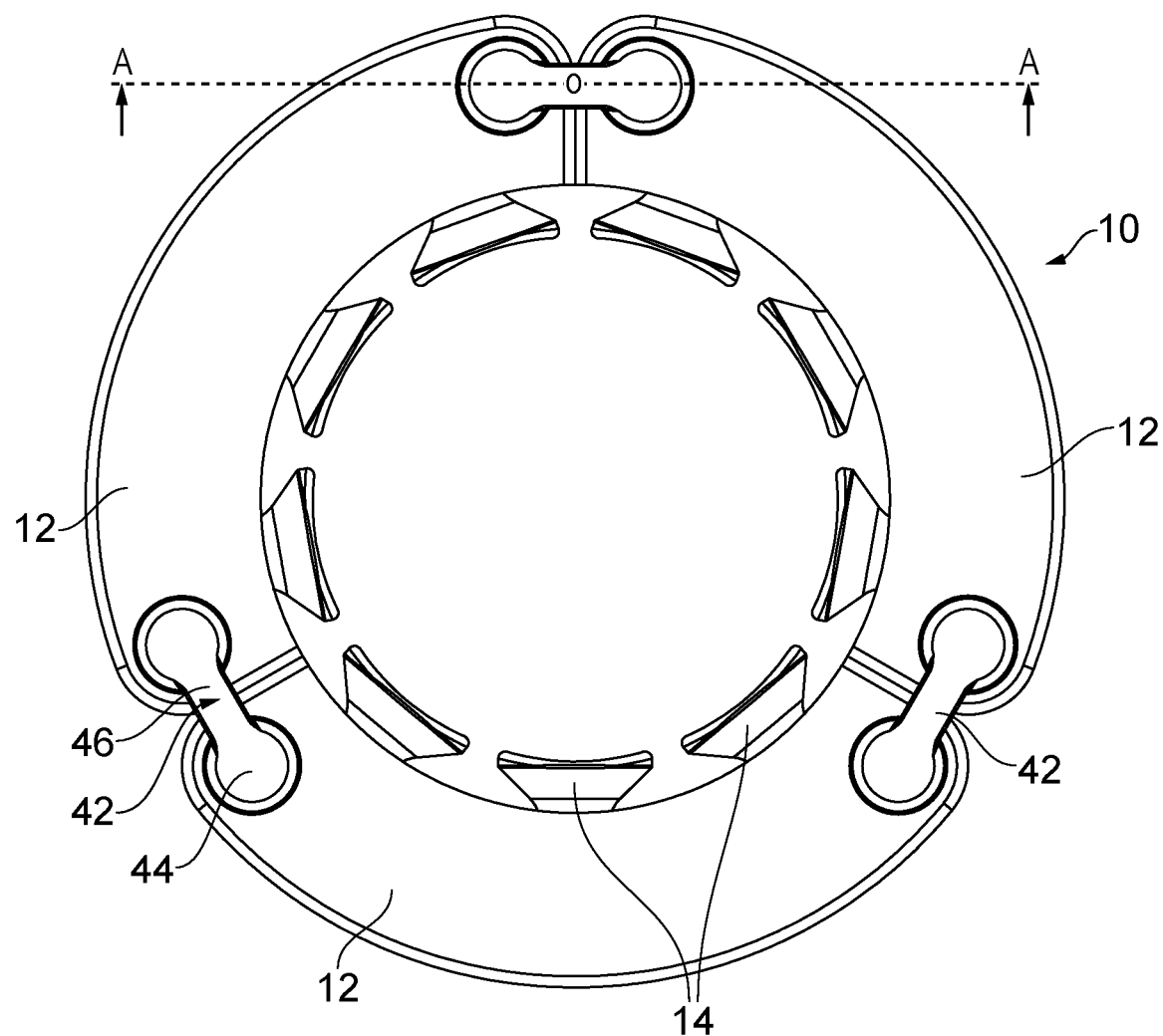
FIG. 1 is an end view of a clamping arrangement according to the invention.

The drawings show in FIG. 1 and other figures, a clamping arrangement 10 of a buoyancy clamp assembly. The arrangement 10 includes three identical arcuate members 12 engageable together to define a ring as shown for example in FIG. 1. Each of the arcuate members 12 comprises a hollow profiled plastics material body made for instance of nylon. Three discrete resilient members 14 are provided on the inner face of each arcuate member 12, and are shown in greater detail in FIGS. 23-28.

A respective fastening assembly 16 is provided selectively engageable between each adjacent pair of arcuate members 12. Each fastening assembly 16 comprises a respective elongate member 18 locatable in a respective passage 20 provided extending parallel to an axial direction, adjacent each end of the arcuate members 12. The elongate members 18 are rotatably mounted in the respective passages 20. Each elongate member 18 has an alignable hole 22, which is alignable with a similar hole 22 in an adjacent elongate member 18.

An outwardly open profiled recess 24 is provided centrally on the outside of each end of the arcuate members 12, which provides access to central parts of the elongate members 18, and particularly the alignable holes 22 therein. A fastening arrangement 26 is provided engageable between respective adjacent elongate members 18.

Figure 2:
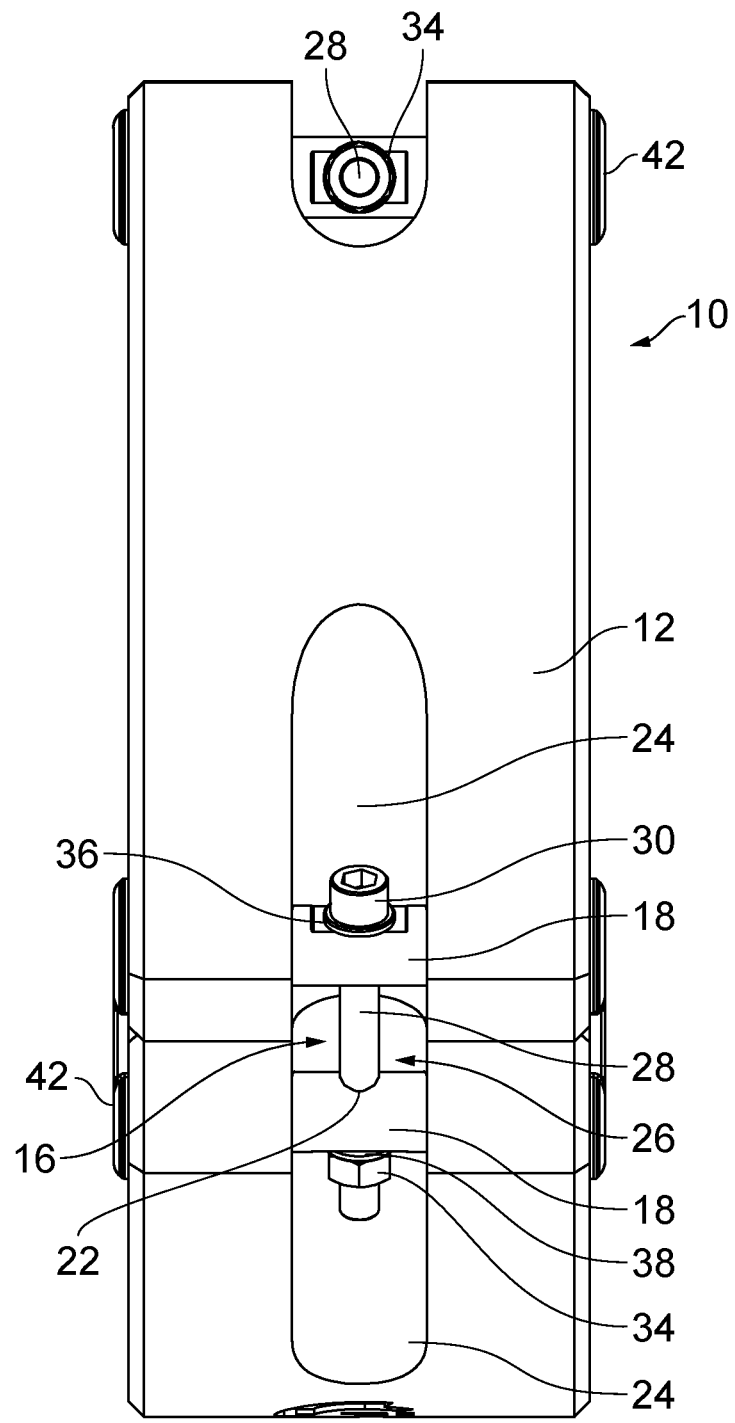
FIG. 2 is a side view of the arrangement of FIG. 1.
Figure 3:
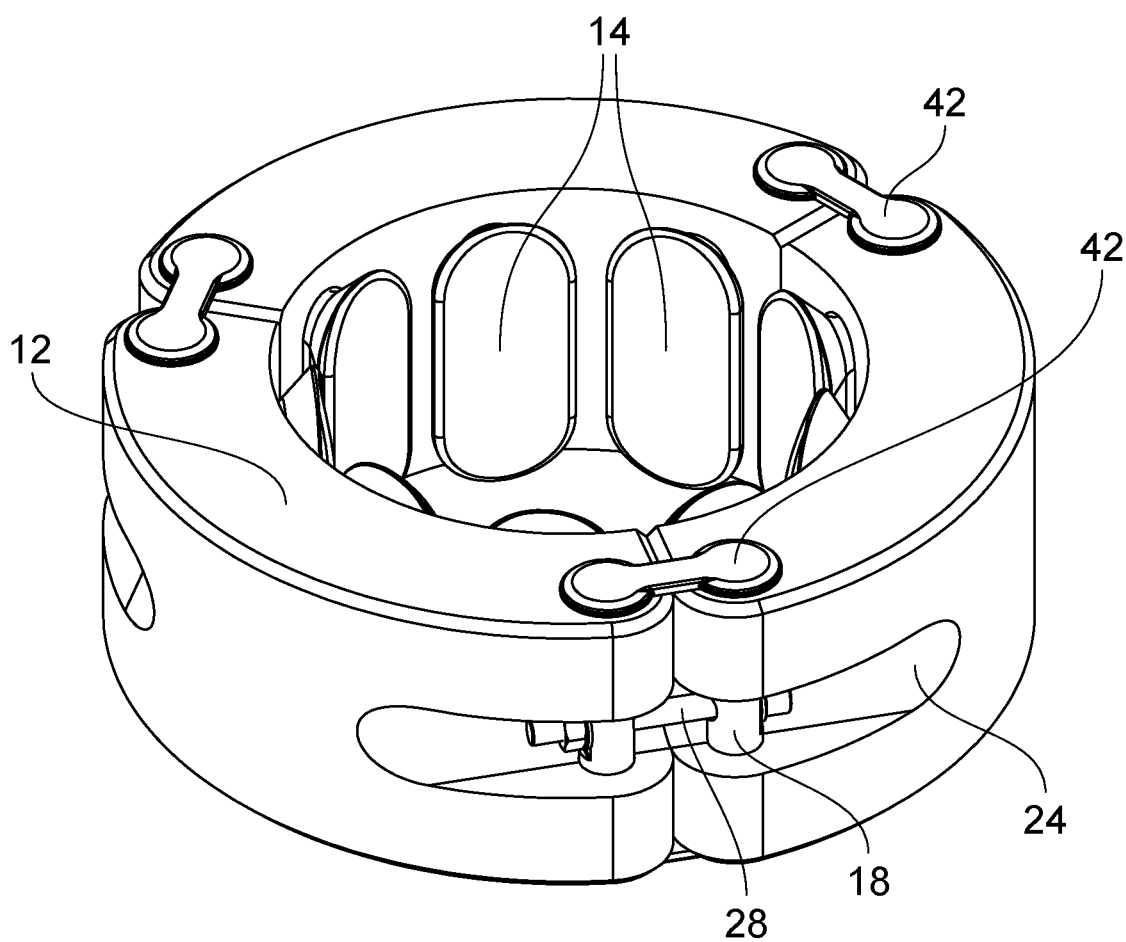
FIG. 3 is a perspective view of the arrangement of FIG. 1.

Each fastening arrangement 26 includes a bolt 28 with a head 30 and a least partially threaded shank. A nut 34 is threadably engageable on the bolts 28 such that with the bolt 28 extending through aligned holes 22 in adjacent elongate members 18 with the head 30 engaging via a washer 36 on the outer side of a one elongate member, and the nut 34 via a further washer 38 engageable on the outer side of the other elongate member 18, adjacent arcuate members 12 can be held together abutting each other to provide a ring as shown for instance in FIGS. 1-3.

Figure 4:
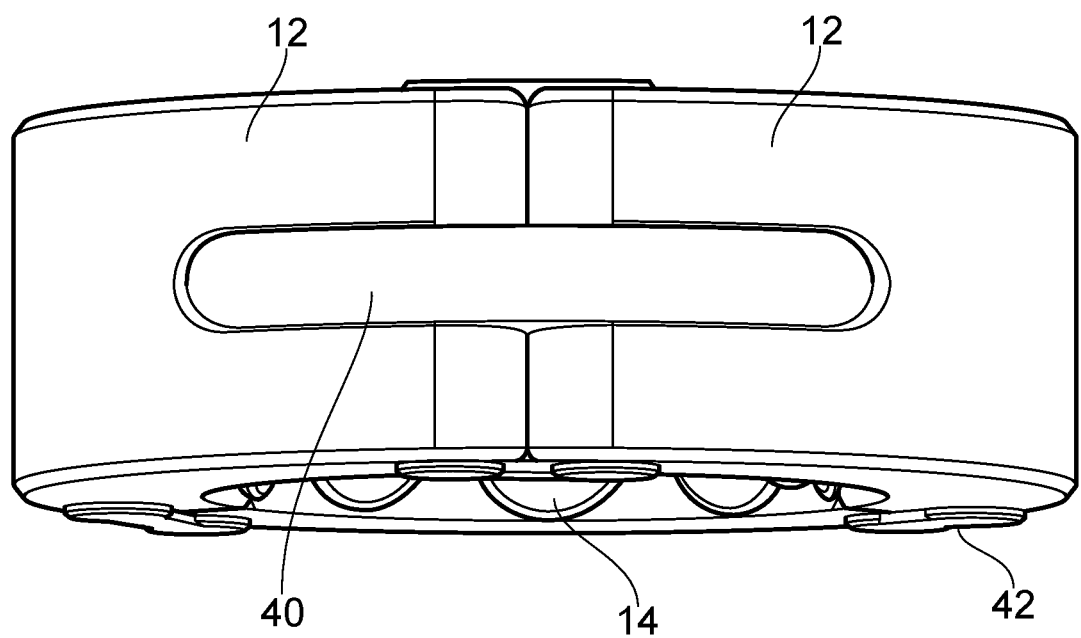
FIG. 4 is a slight perspective side view of the arrangement of FIG. 1 with a cover fitted.
Figure 5:
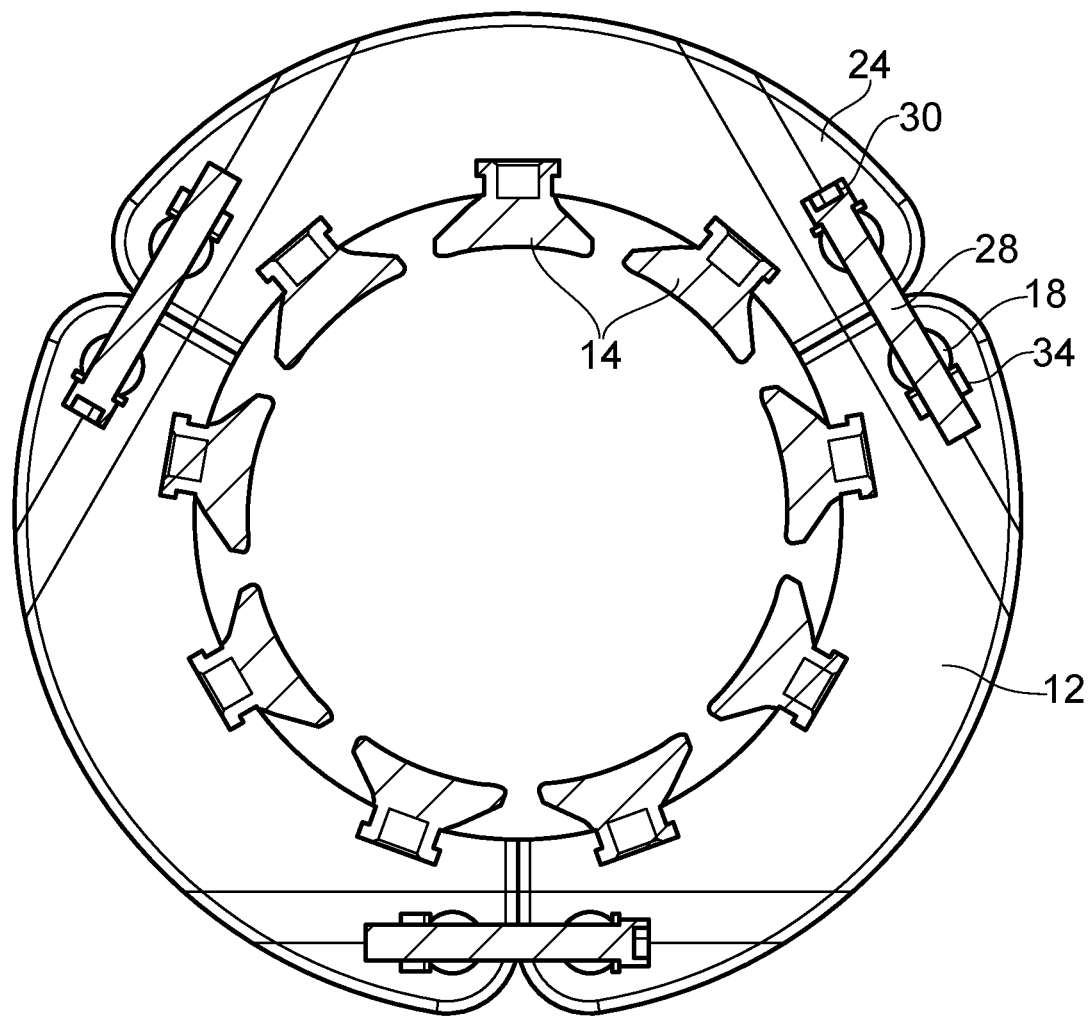
FIG. 5 is a cross sectional end view of the arrangement of FIG. 1.
Figure 6:
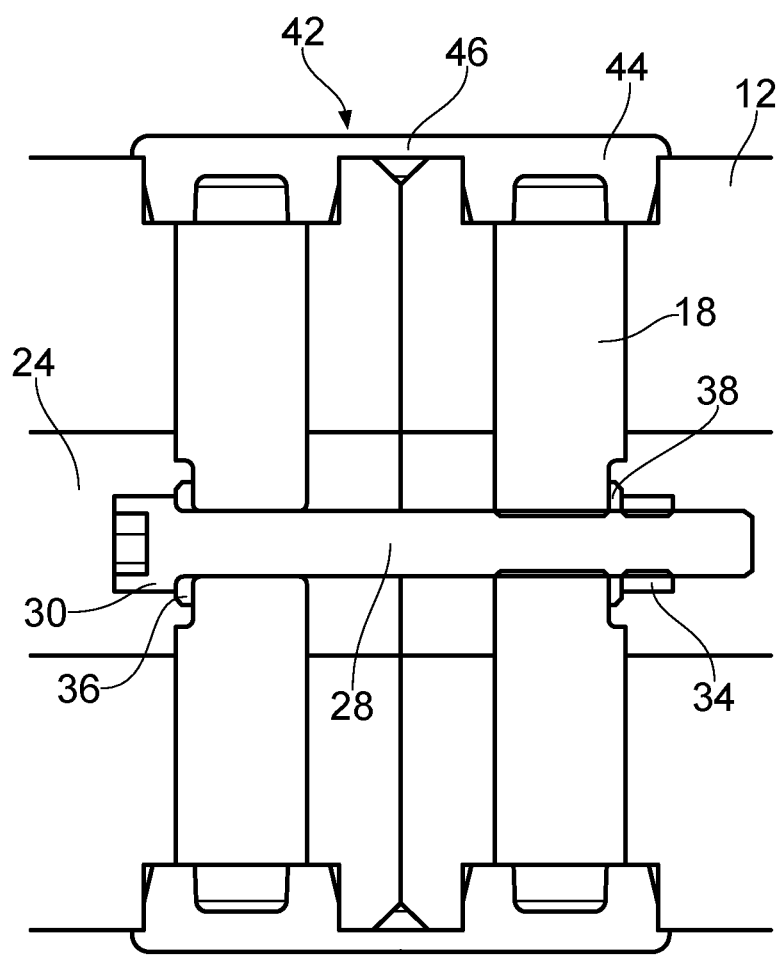
FIG. 6 is a cross sectional view along the line A-A of FIG. 1.

A cover member 40 is provided across recesses 24 in adjacent arcuate members 12, to close off the recesses 24. The cover member 40 is shown in FIG. 4 and in more detail in FIGS. 36-39.

A pair of engagement members 42 are provided extendable between each adjacent pair of arcuate members 12. The engagement members comprise a circular section engagement part 44 locatable in a snap fit, but so as to permit rotatable movement, in the respective end of a passage 20. When in the end of a passage 20 the engagement part 44 will also rotatingly engage the end of a respective elongate member 18. A link member 46 in the form of a web extends between each engagement part 44.

FIGS. 29-35 show the engagement members 42 in more detail. Each engagement part 44 has a circular head 48 which is larger than the cross section of the passages 20, and is therefore engageable against the end thereof. A gently tapering hollow body 50 extends from the head 48 so as to be locatable in an end of a one of the passages 20. A rib 52 is provided on the outside of the body 50 part way therealong, to retain the engagement part in a respective passage 20. The opening 54 in the hollow body 50 is of a size to slidingly receive an end of an elongate member 18.

The cover member 40 is shown in more detail in FIGS. 36-39 and has an arcuate head 56 of a size to close a pair of adjacent recesses 24. A rib structure 58 is provided on the inner side of the head 56 to locate and retain the cover member 40 in a friction fit in a pair of adjacent recesses 24.

A one of the discrete resilient members 14 is shown in more detail in FIGS. 24-28. The resilient member 14 has a hollow base 60 with an outwardly extending lip 62 to facilitate mounting thereof on a respective arcuate member 12. A solid profiled head 64 extends from the base 60. As can be seen, the resilient member 14 is oval, with its longitudinal direction extending axially. The profiled head 64 diverges both longitudinally and laterally from the base 60 and presents a concave engagement face 66. The resilient member 14 may be made of rubber or neoprene.

Figure 7:
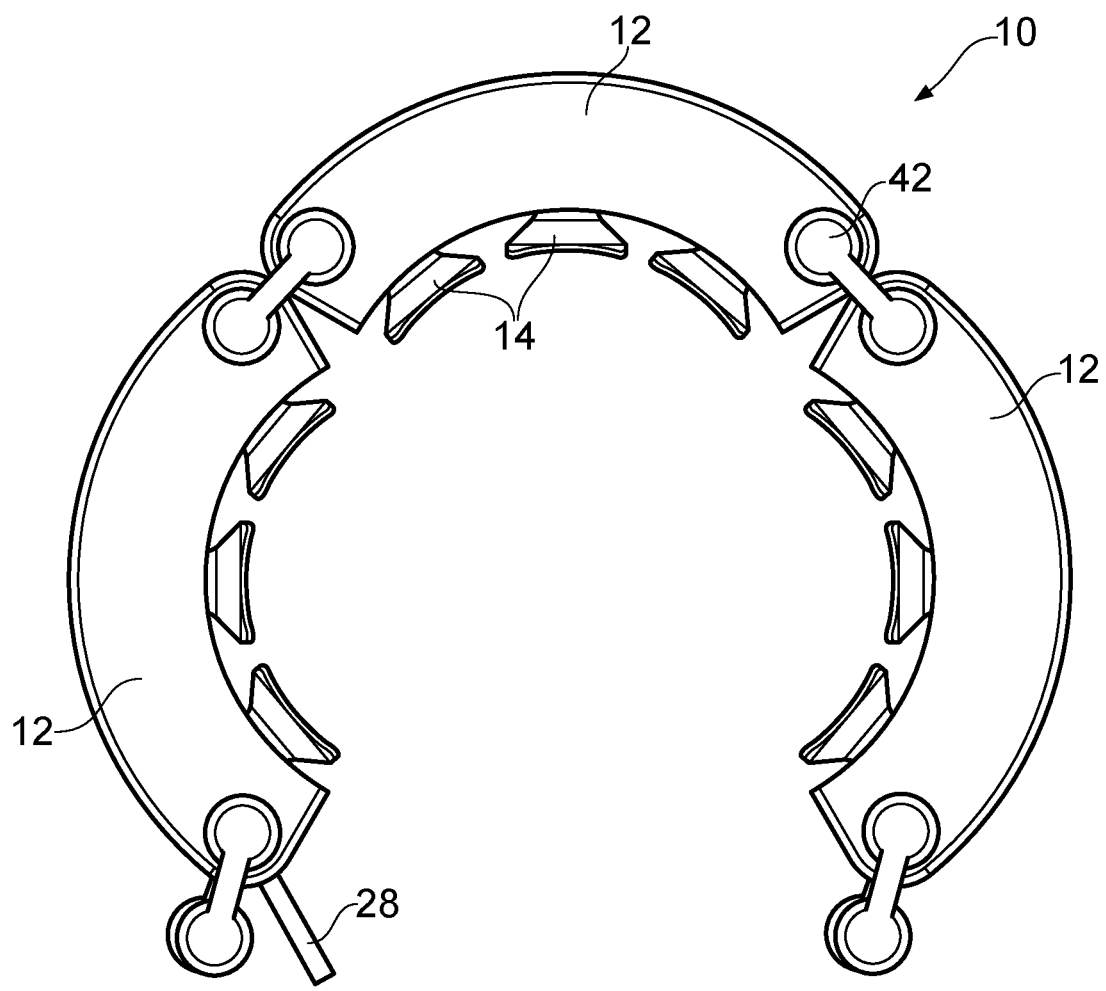
FIG. 7 is an end view of the arrangement of FIG. 1 in a position ready to be fitted onto a pipe.

FIG. 7 shows the clamping arrangement 10 opened outwardly so as to be engageable for instance with a pipe 68. In this instance the fastening arrangement 26 between two of the arcuate members 12 has been undone such that the bolt 28 remains on a one of the arcuate members 12 and is released from the elongate member 18 on the other arcuate member 12. The two other fastening arrangements 26 and the respective engagement members 42 permit the two separated arcuate members to pivot outwardly relative to the other arcuate member.

Figure 8:
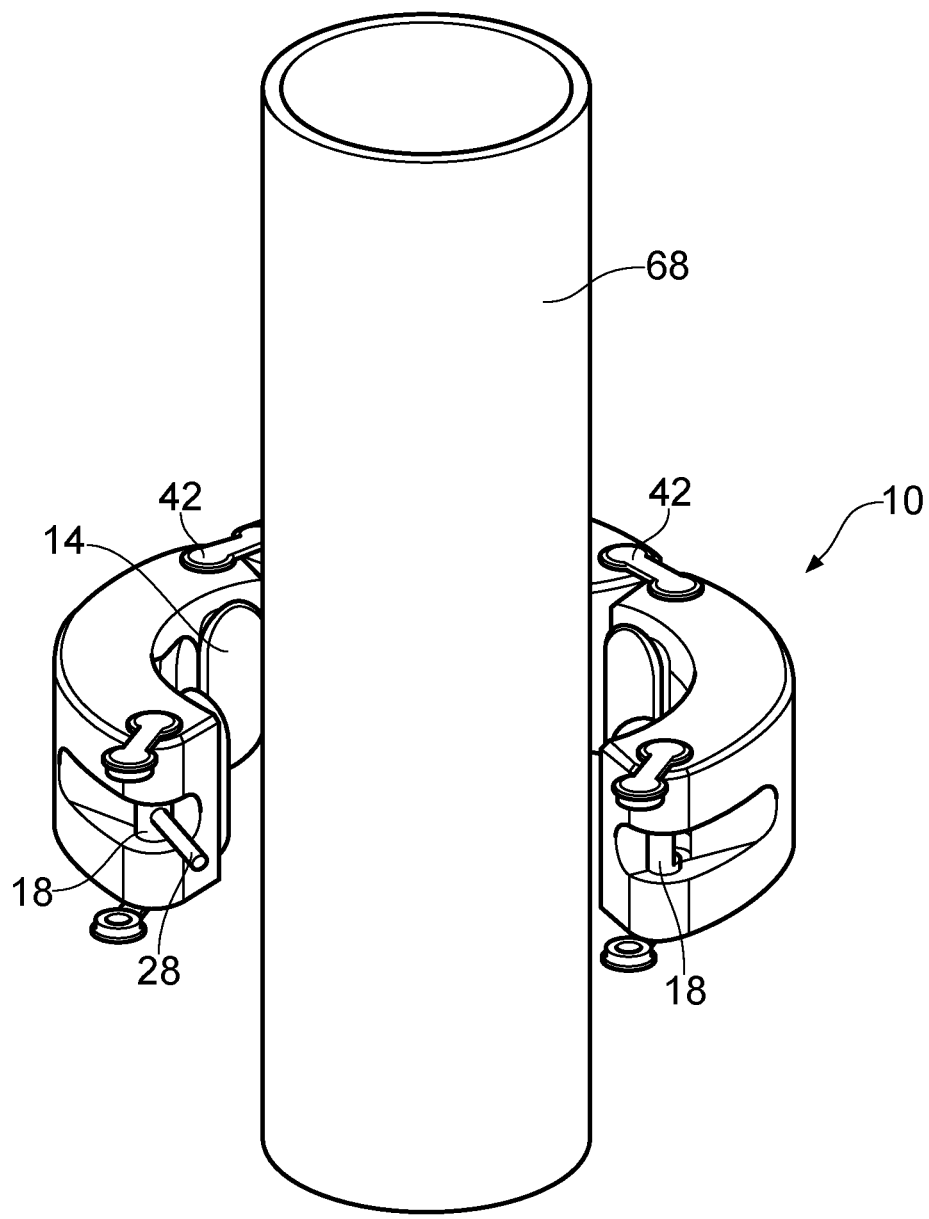
FIG. 8 shows the arrangement of FIG. 1 being fitted onto a pipe.

FIG. 8 shows the arrangement 10 being mounted on the pipe 68. Once in position the respective bolt 28 can engage with the elongate member 18 on the adjacent arcuate member and can be tightened onto the pipe 68. As the clamping arrangement 10 is tightened onto the pipe 68 the discrete resilient members 14 will deform and provide a strong clamping force on the pipe 68. It is to be realised that the discrete resilient members 14 can also adapt to changes in a shape and/or size of the pipe 68 due for instance to changes in temperature, and particularly of fluid flowing through the pipe 68, and also if the pipe 68 may tend to expand at all if the internal pressure is increased.

The arrangement 10 is configured such that when the respective arcuate members 12 are brought into contact with each other by the respective fastening assemblies 16, around the pipe 68, the arrangement 10 will be clamped onto the pipe 68 by the resilient members 14. This configuration means that it is not necessary to apply a particular torque to the fastening assemblies 16 as has often been the case with prior proposals. This means that it is not necessary to have to use particular equipment, often in difficult working conditions, to apply a predetermined torque to the fastening assemblies.

Figure 9:
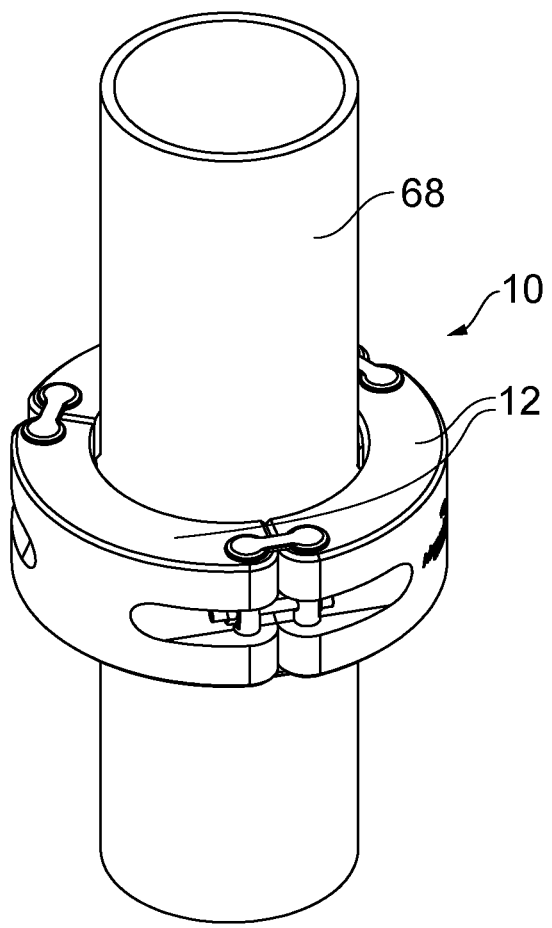
FIG. 9 is a perspective end view of the arrangement of FIG. 1 mounted on a pipe.
Figure 10:
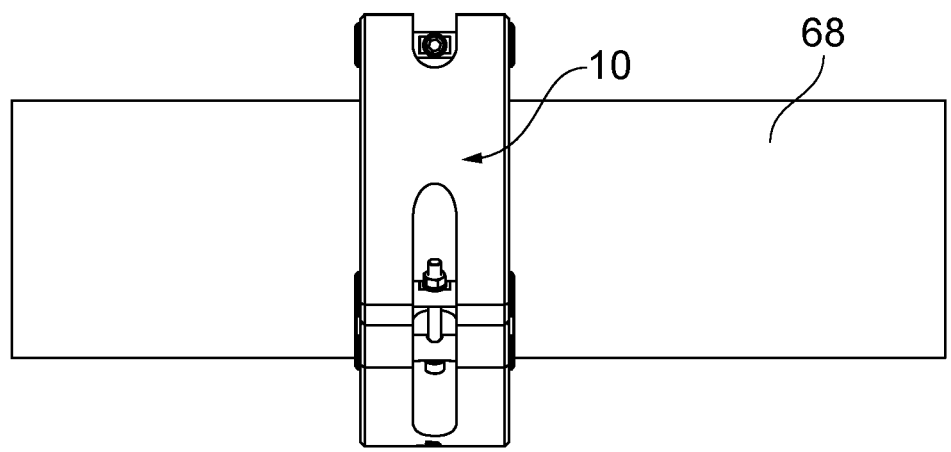
FIG. 10 is a side view of the arrangement of FIG. 1 mounted on a pipe.
Figure 11:
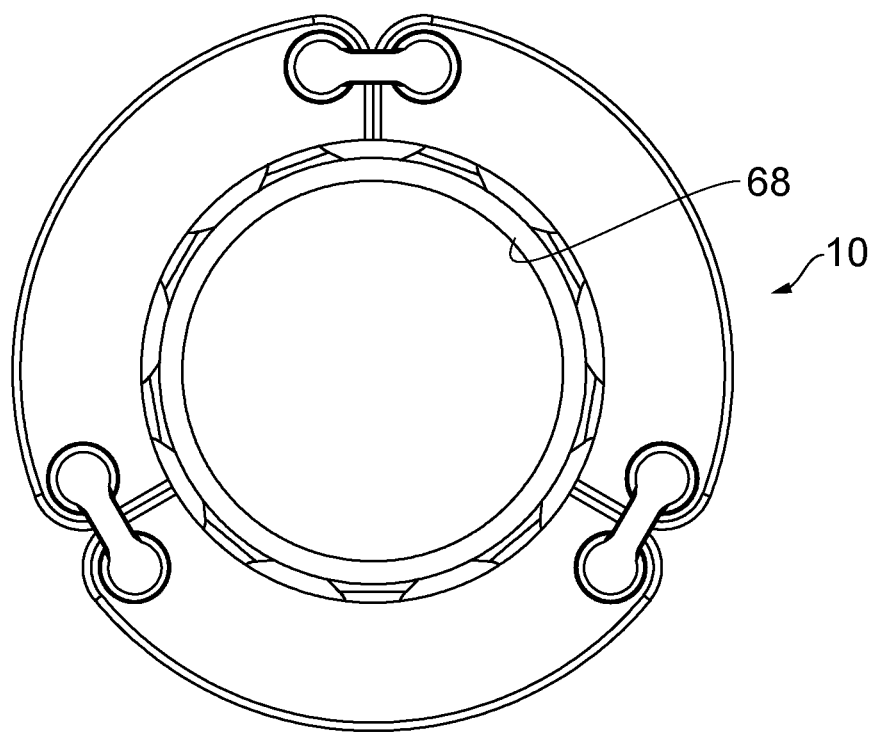
FIG. 11 is an end view of the arrangement of FIG. 1 mounted on a pipe.

Engagement members 42 are provided either side of the undone fastening arrangement 26 to retain the elongate members 18 in place. One pair of members 42 will be removed when the arrangement 26 is closed. FIGS. 9-11 show the clamping arrangement 10 mounted on the pipe 68.

FIGS. 14-17 show a clamp assembly with two clamping arrangements 10 radially aligned with each other. In this instance common longer elongate members 70 have been provided which extend through both of the clamping arrangements, and each elongate member has two alignable holes 72 through which respective bolts 28 can extend.

Such an arrangement could be used where a greater clamping force is required than could be provided by a single clamping arrangement 10. Obviously more than two clamping arrangements 10 could be used in such an arrangement if required.

Figure 18:
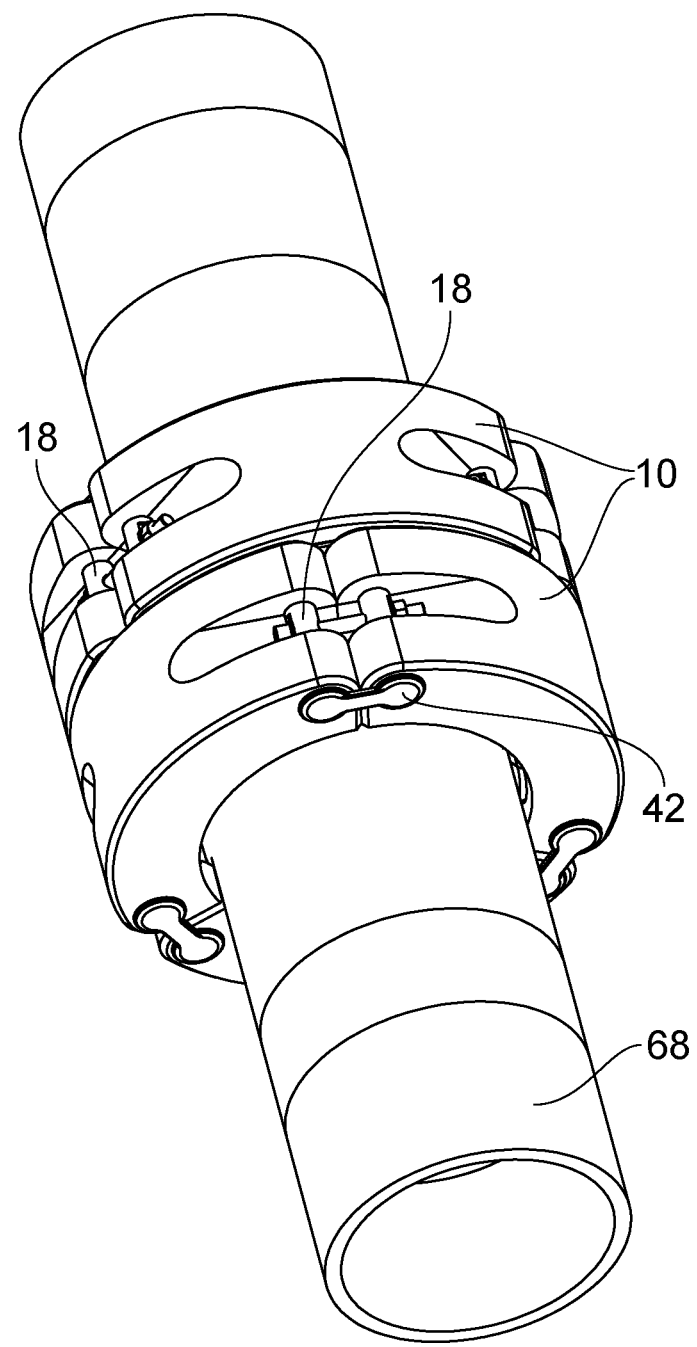
FIG. 18 is a perspective end view of two clamping arrangements according to the invention mounted on a pipe in a second configuration.

FIG. 18 shows a further clamp assembly again with two clamping arrangements 10. In this instance each of the clamping arrangements 10 is offset by about 60° relative to each other. In this instance separate elongate members 18 are provided in each clamping arrangement. With this arrangement the adjacent clamping arrangements urge the respective engagement members 42 in position.

In this arrangement the engagement members 42 are offset, therefore providing greater resistant to twisting of the respective arcuate members 12. Also the discrete resilient members 14 in adjacent clamping arrangements are offset, thereby spreading the gripping load around the pipe 68.

Figure 19:
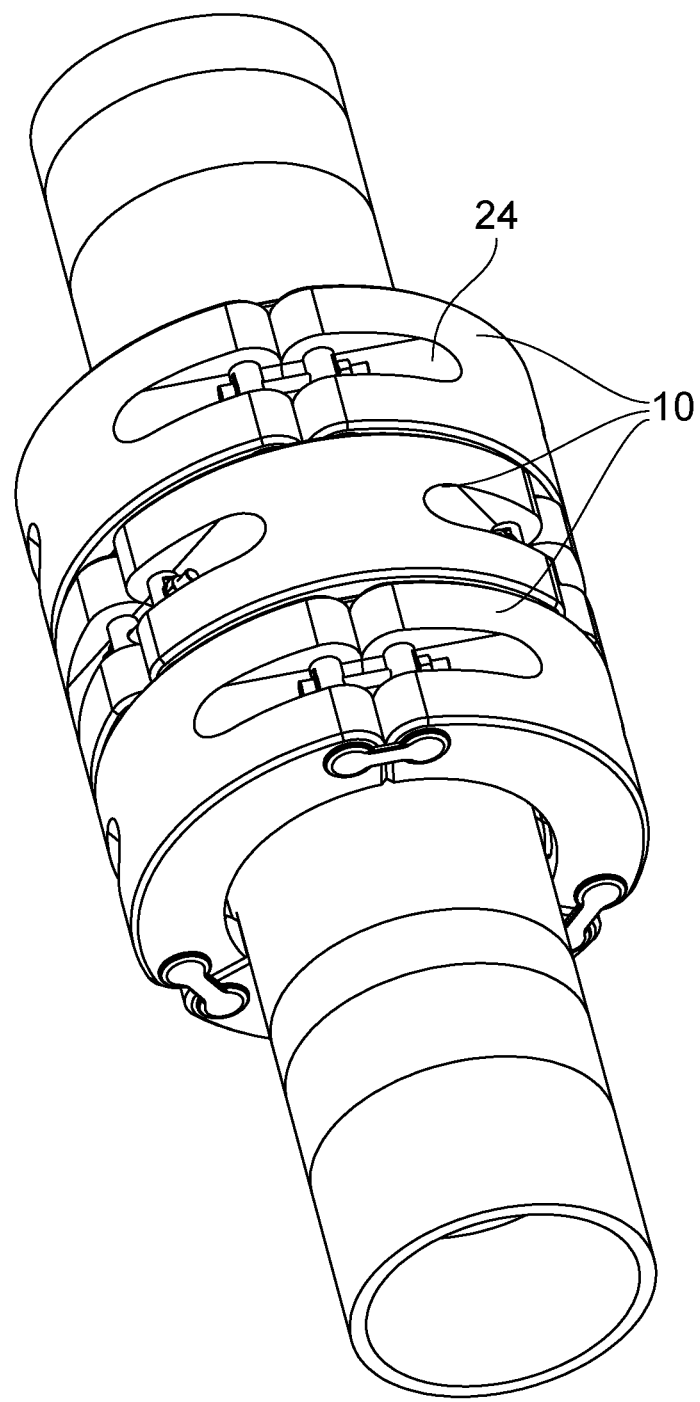
FIG. 19 is a similar view to FIG. 18 but of three clamping arrangements mounted on a pipe.
Figure 20:
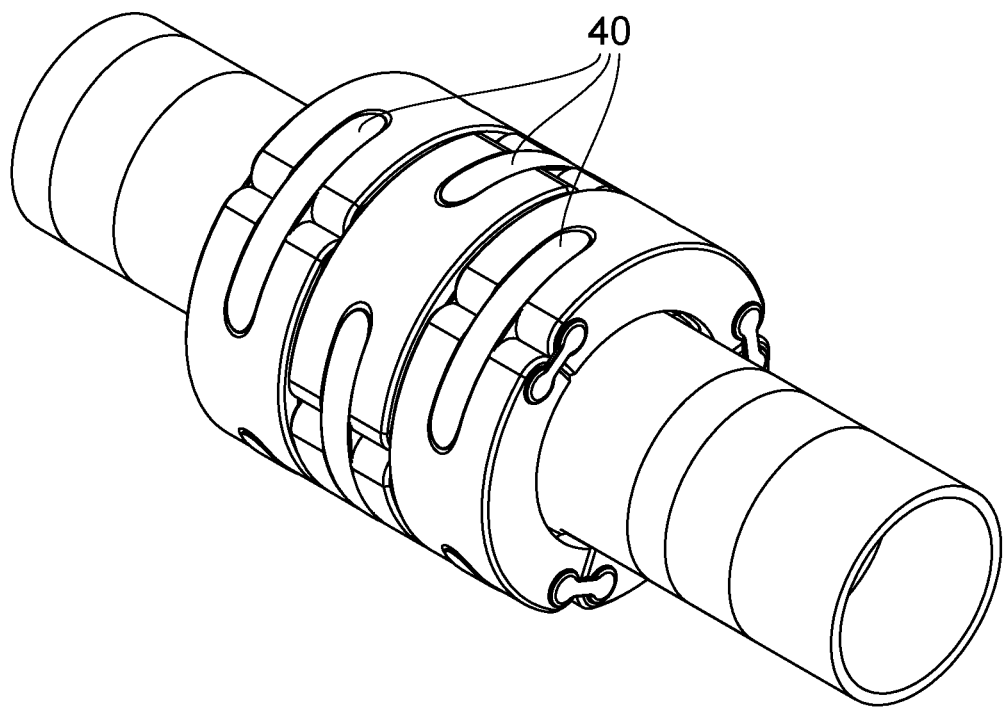
FIG. 20 is a perspective end view of the clamping arrangements of FIG. 19 mounted on a pipe and with covers fitted.
Figure 21:
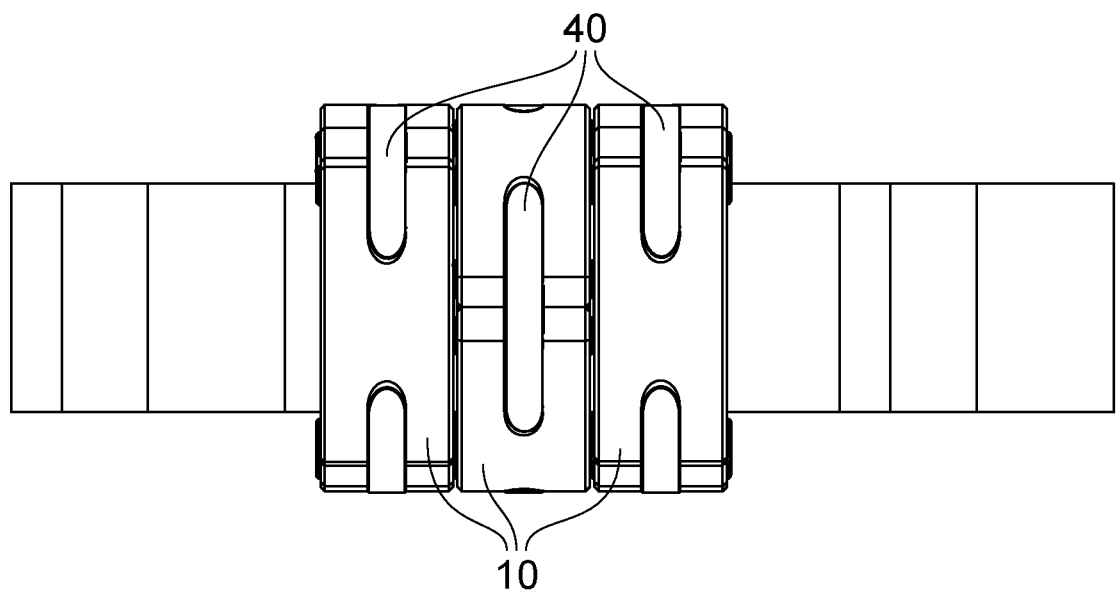
FIG. 21 is a side view of the clamping arrangements of FIG. 20.
Figure 22:
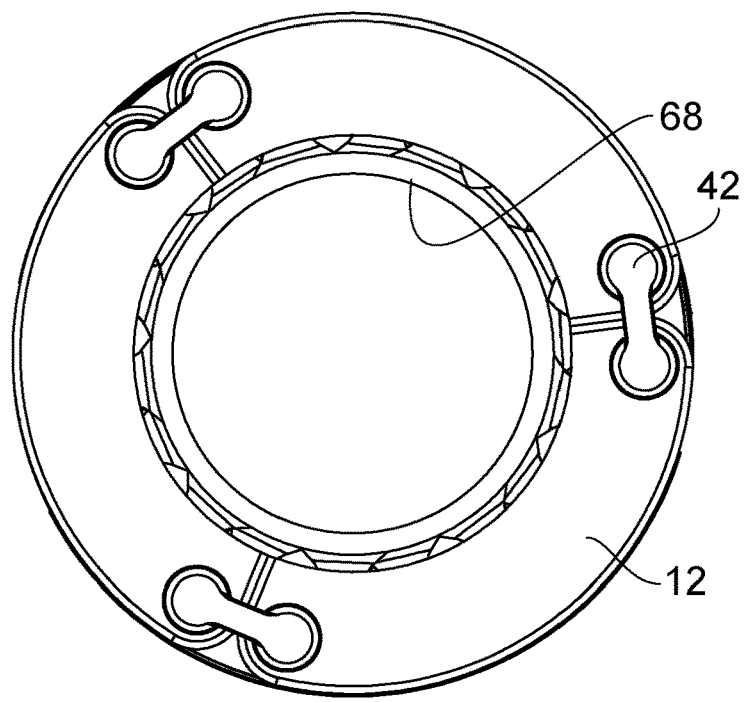
FIG. 22 is an end view of the clamping arrangements of FIG. 19.
Figure 23:
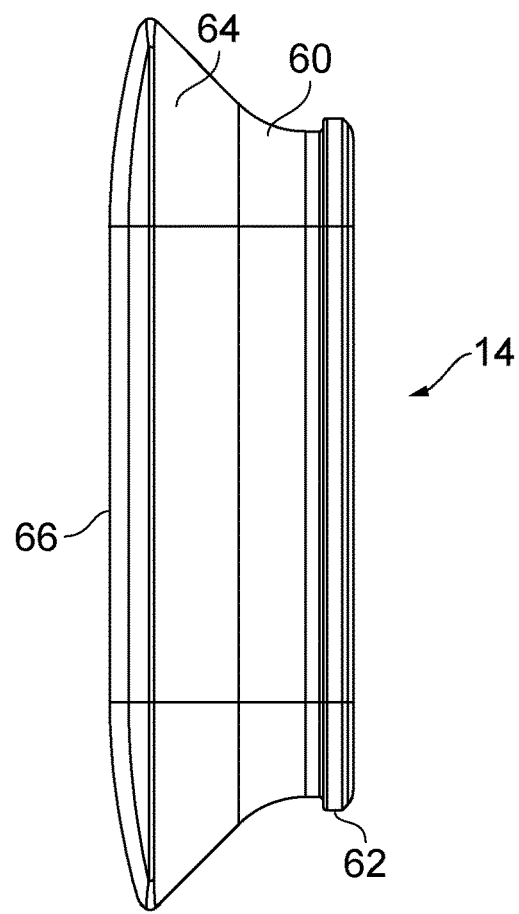
FIG. 23 is a side view of a first component of the clamping arrangement according to the invention.
Figure 24:
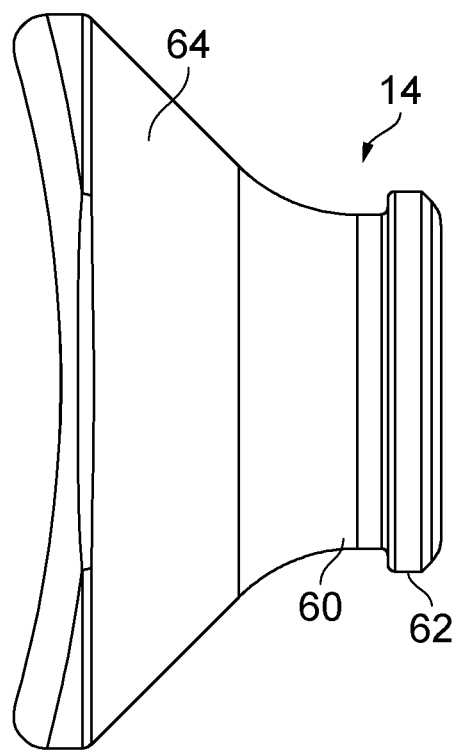
FIG. 24 is an end view of the first component.
Figure 25:
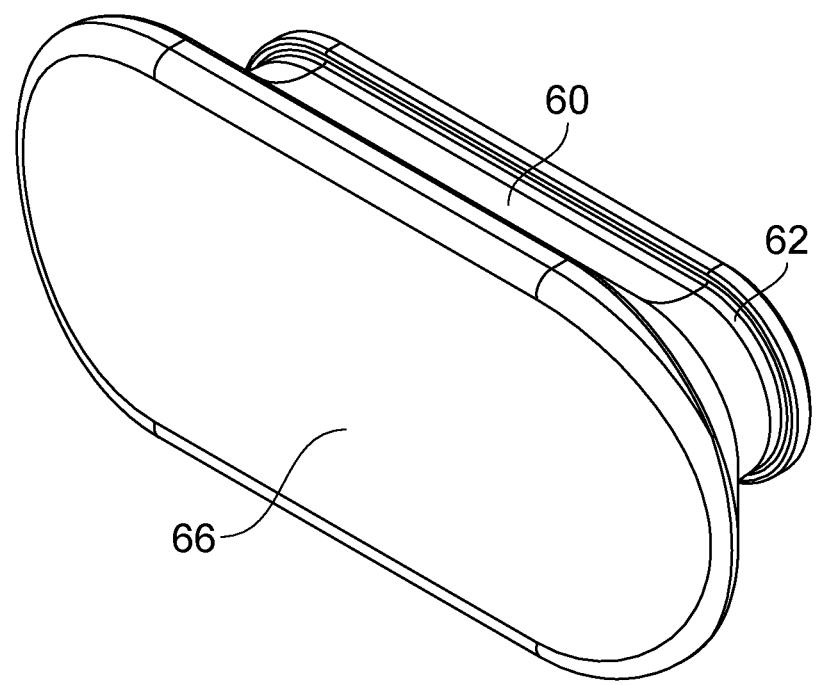
FIG. 25 is a perspective top view of the first component.
Figure 26:
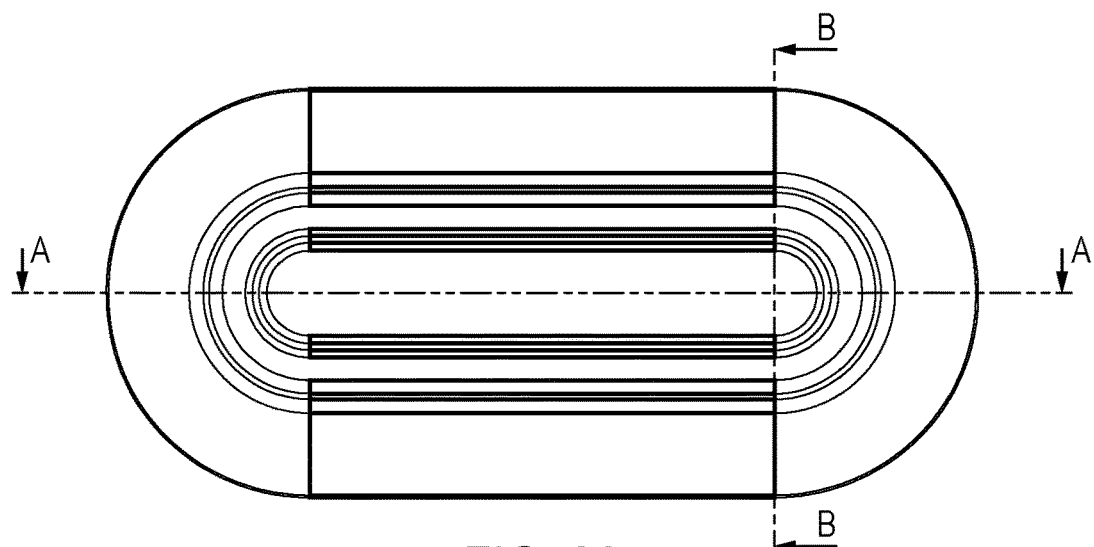
FIG. 26 is a view from beneath of the first component.
Figure 27:
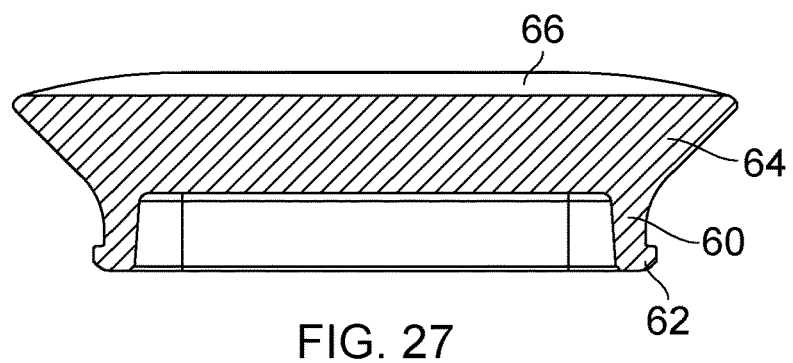
FIGS. 27 and 28 are respectively sectional views along the lines A-A and B-B of FIG. 26.
Figure 28:
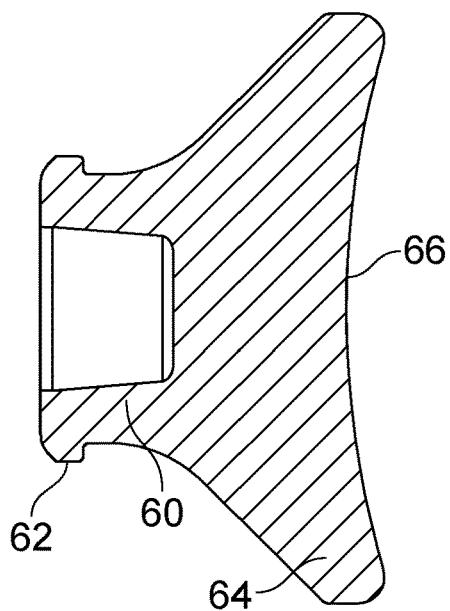
Figure 29:
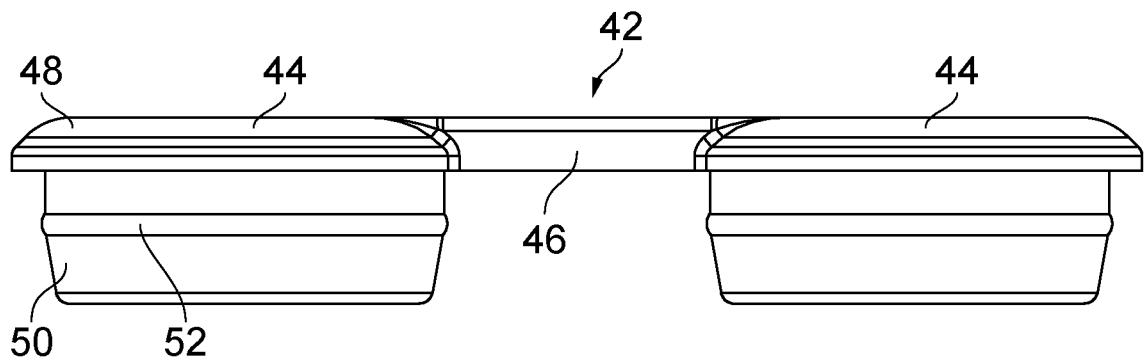
FIG. 29 is a side view of a second component of a clamping arrangement according to the invention.
Figure 30:
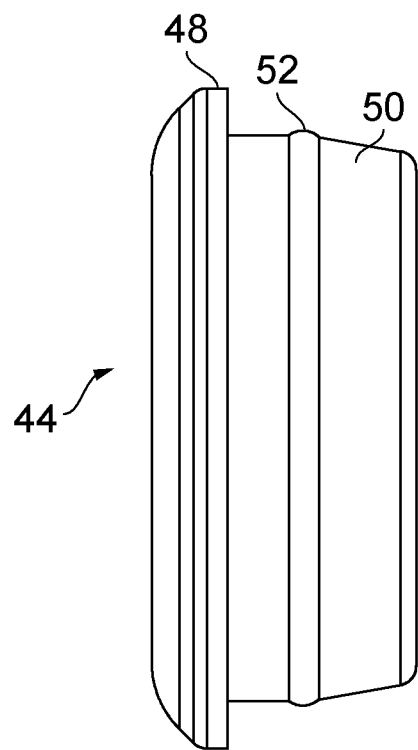
FIG. 30 is an end view of the second component.
Figure 31:
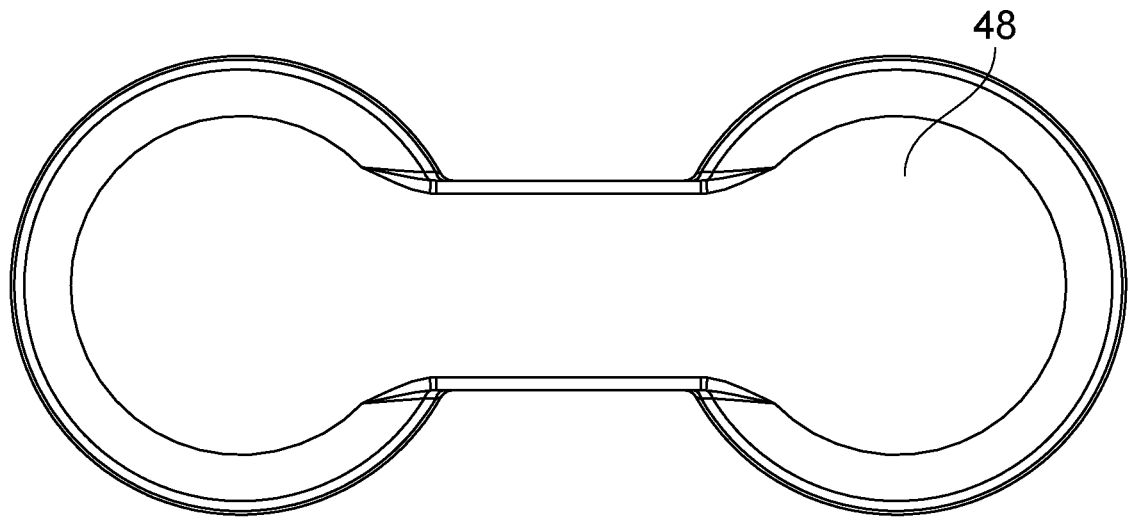
FIG. 31 is a top view of the first component.
Figure 32:
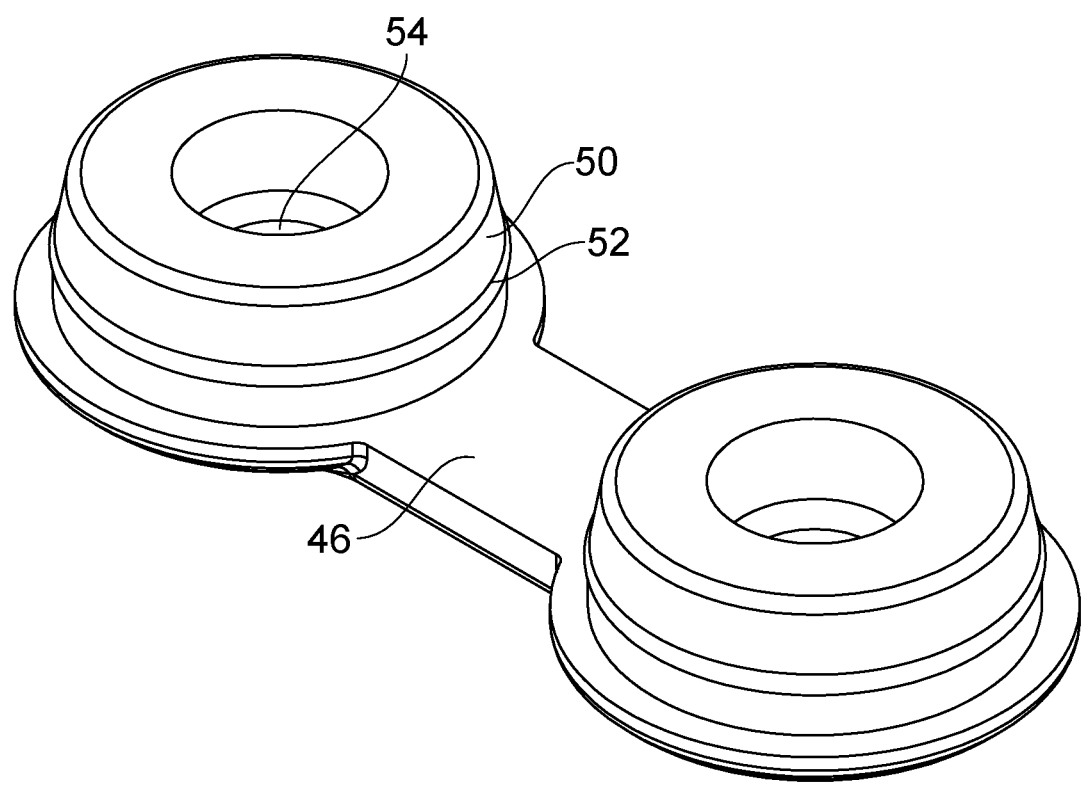
FIG. 32 is a perspective underneath view of the second component.
Figure 33:
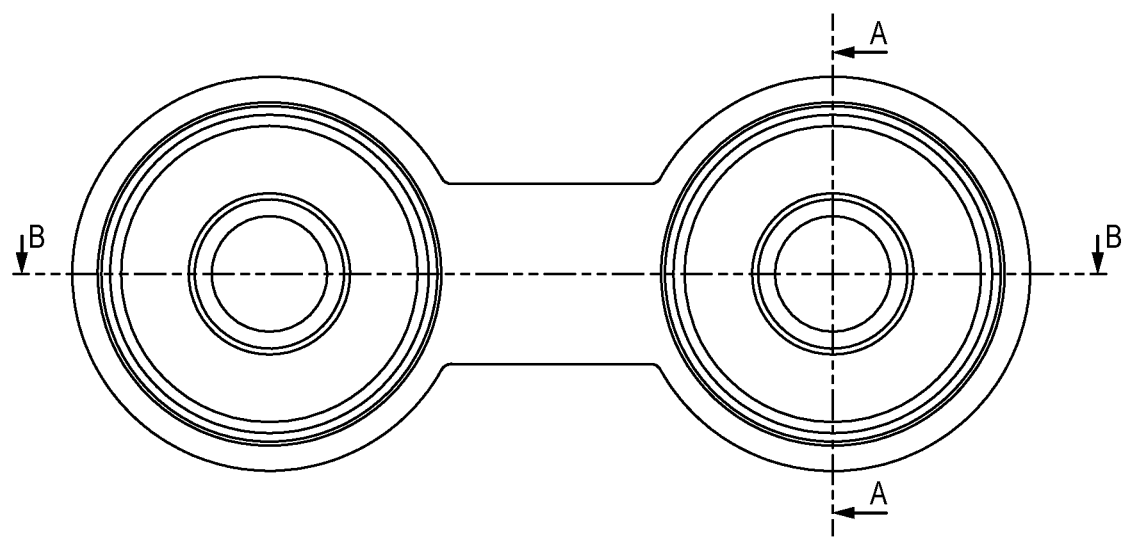
FIG. 33 is a underneath view of the second component.
Figure 34:
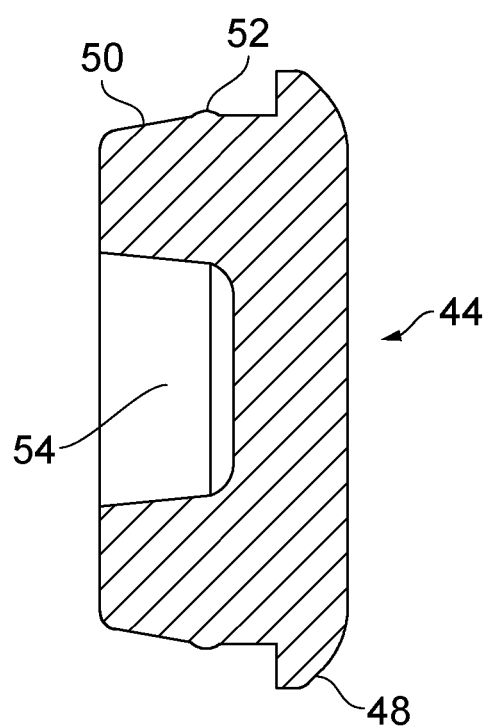
FIGS. 34 and 35 are respectively sectional views along the lines A-A and B-B of FIG. 33.
Figure 35:
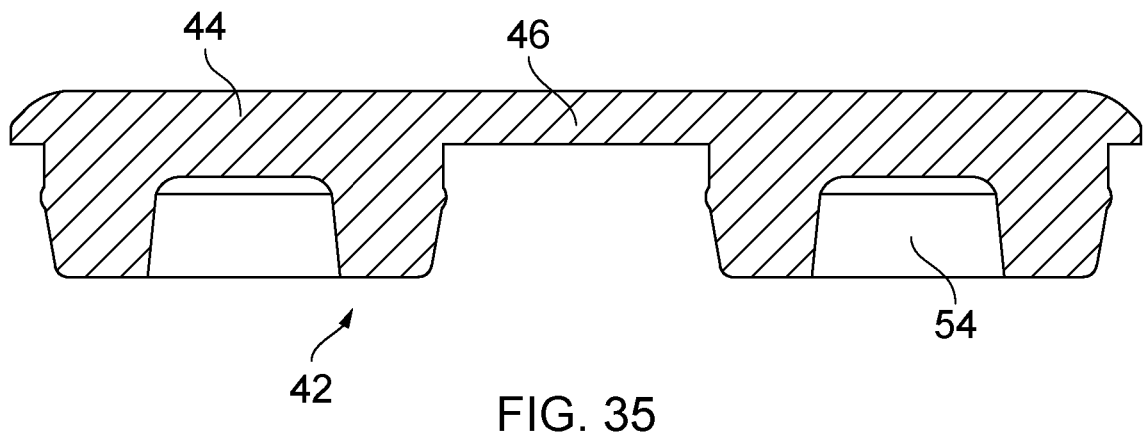
Figure 36:
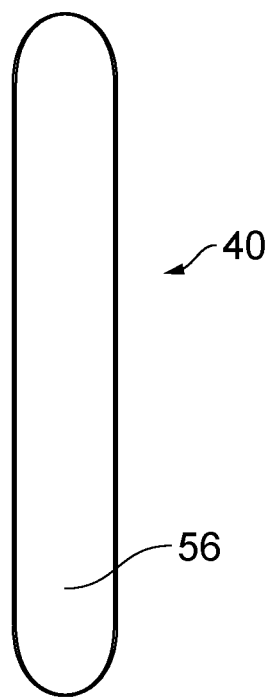
FIG. 36 is a top view of a third component of a clamping arrangement according to the invention.
Figure 37:
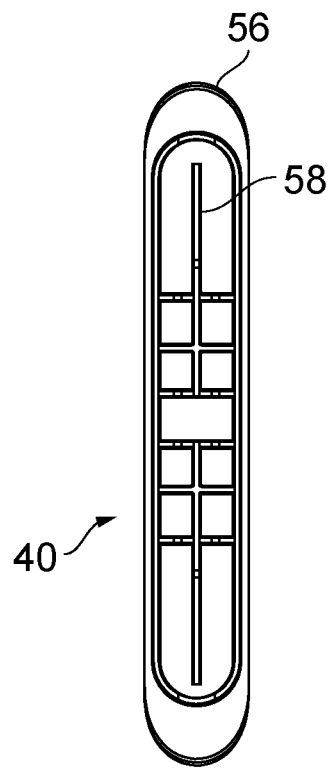
FIG. 37 is an underside view of the third component.
Figure 38:
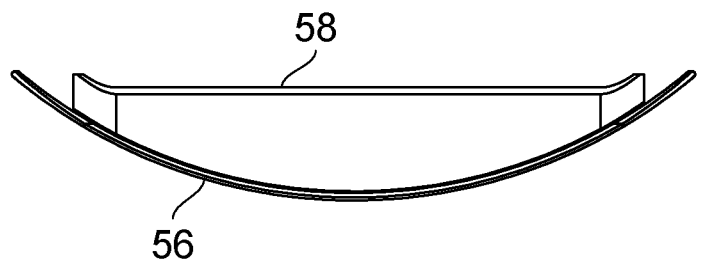
FIG. 38 is a side view of the third component.
Figure 39:
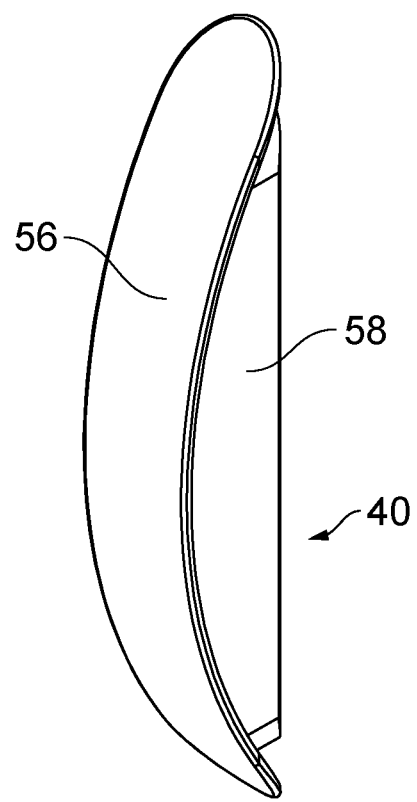
FIG. 39 is a top perspective view of the third component.

FIGS. 19-22 show a third clamp assembly with three clamping arrangements 10, with the cover members 40 removed in FIG. 19. In this instance the central clamping arrangement 10 is radially offset again by around 60° relative to the two end clamping arrangements 10 which are radially aligned relative to each other.

Figure 12:
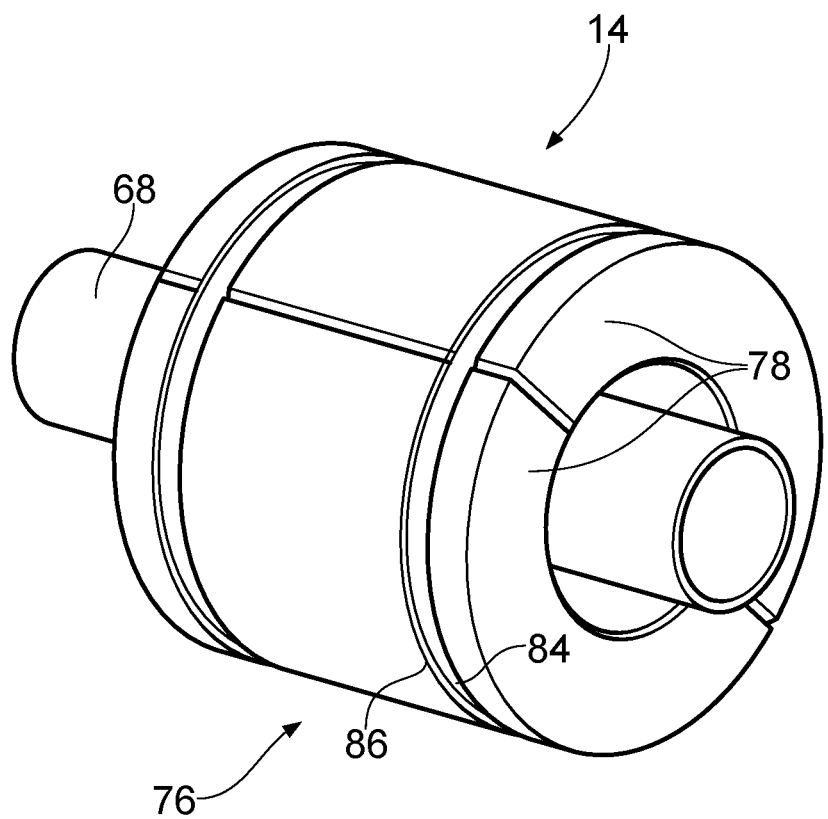
FIG. 12 is a perspective view of a buoyancy clamp assembly according to the invention.
Figure 13:
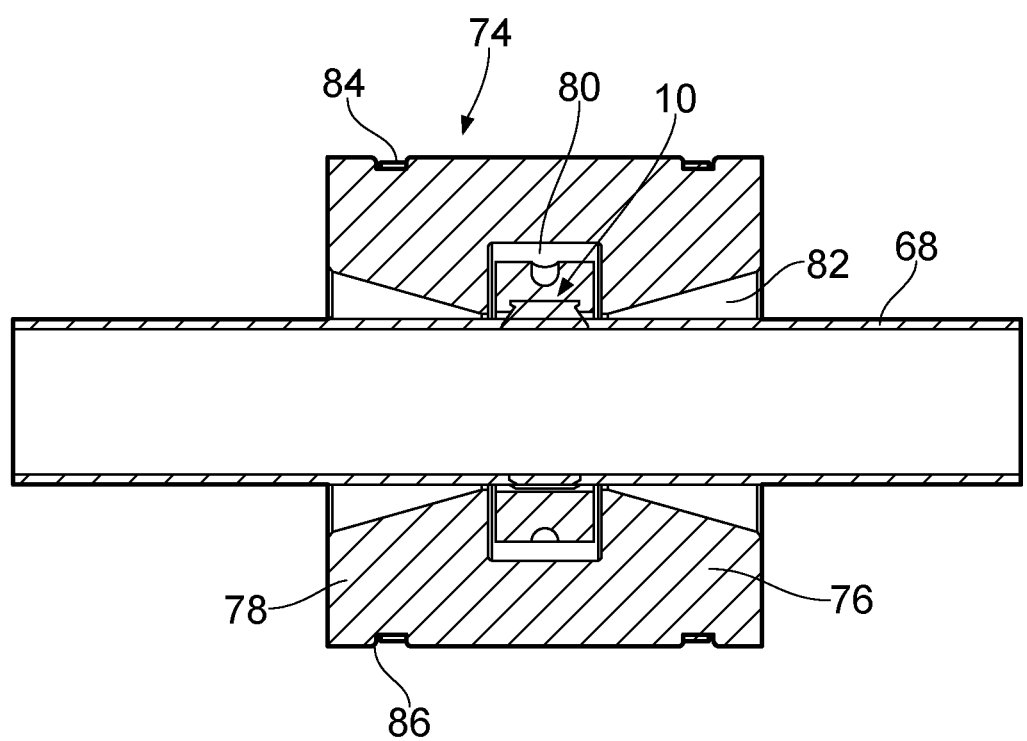
FIG. 13 is a cross sectional side view through the assembly of FIG. 12.
Figure 14:
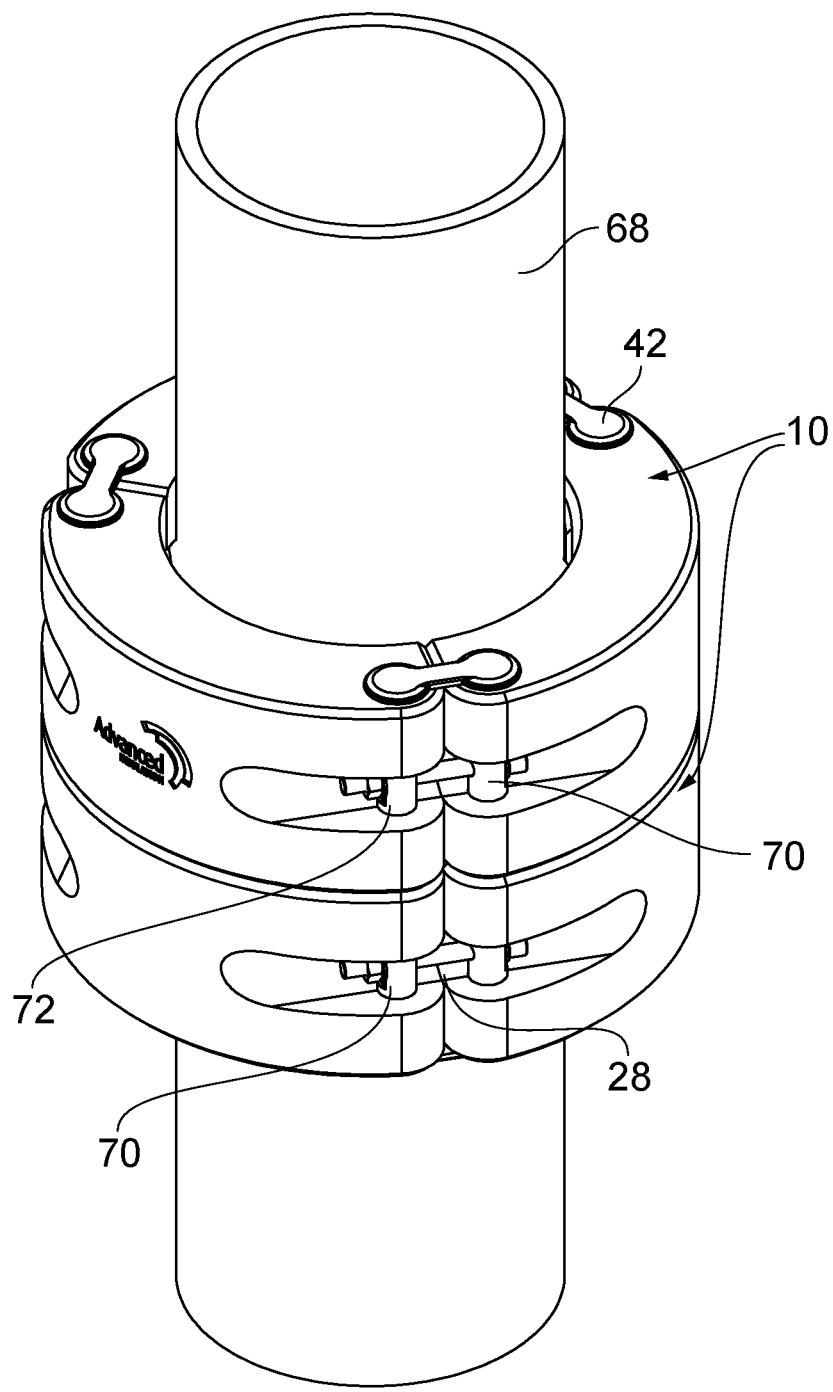
FIG. 14 is a perspective end view showing two arrangements according to the invention mounted on a pipe in a first configuration.
Figure 15:
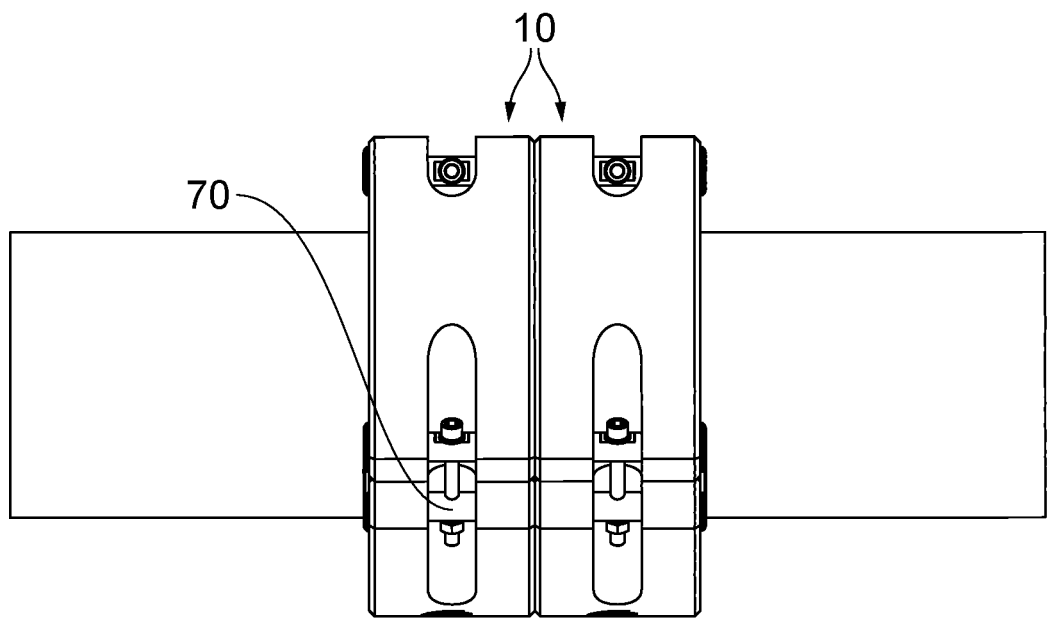
FIG. 15 is a side view of the two arrangements of FIG. 14 mounted on a pipe.
Figure 16:
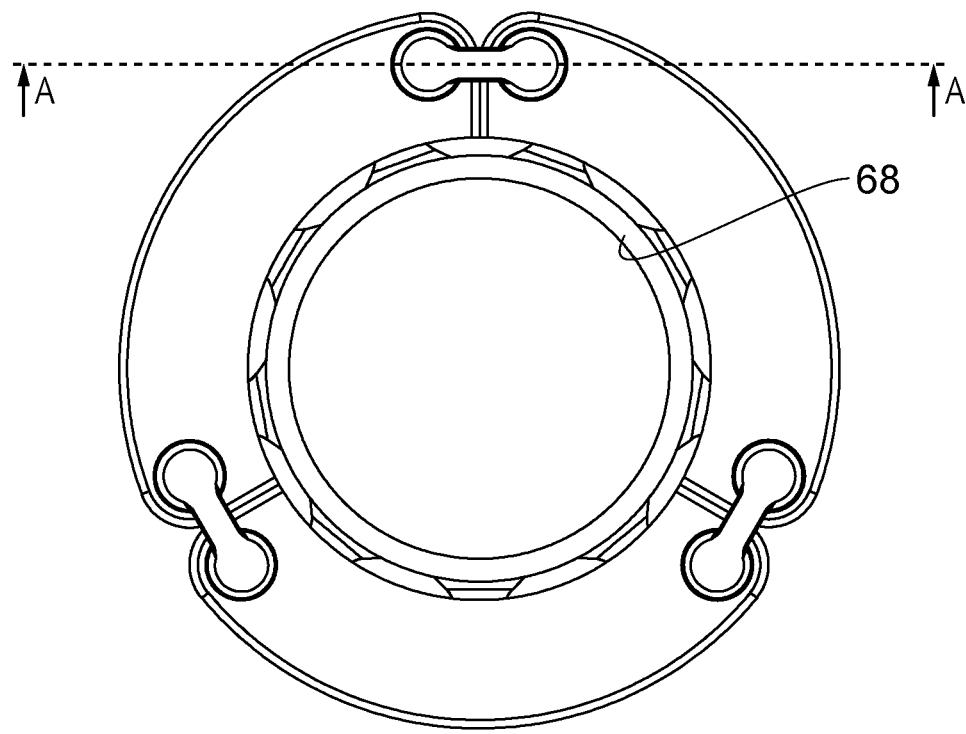
FIG. 16 is an end view of the two arrangements of FIG. 14 mounted on a pipe.
Figure 17:
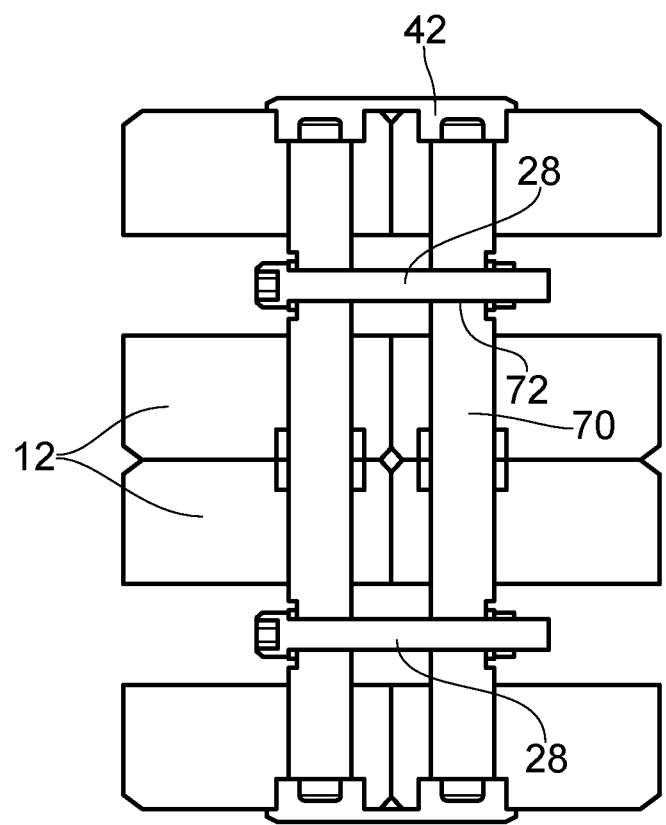
FIG. 17 is a sectional view along the line A-A of FIG. 16.

FIGS. 12 and 13 show a clamp assembly also including a buoyancy arrangement 74. The buoyancy arrangement includes a two part 78 hollow buoyancy member 76, which has identical parts. Each part 78 has an internal profile with a rectangular section recess 80 to receive a clamping arrangement 10, and diverging passages 82 extending each way from the recess 80 to receive a pipe 68. The two parts 78 are held together by straps 84 engaging with circumferential grooves 86 in the part 78. Each of the parts 78 is hollow and may be filled with a buoyancy material such as a foamed material which may be a syntactic foam. Different buoyancy members may be provided with different buoyancy materials depending on the amount of buoyancy required.

There is thus described a buoyancy clamp assembly, and also clamping arrangements for such an assembly which can readily be located in position yet securely locate on a pipe even during variations in the size and/or profile of the pipe. The system is modular and can permit temporarily or permanently differing numbers of clamping arrangements to be used, and in different orientations. As indicated different buoyancy materials may be provided in the buoyancy members as required.

The provision of the cover members prevents water flowing past the fastening arrangements and hence marine growth thereon, which flowing water is required for growth.

The design of the discrete resilient members, and particularly the profile of the engagement face provides a friction grip against the pipe when located in position, and provides increased surface contact. This profile also can accept deviations in the pipe surface whilst retaining consistent clamping pressure, even during expansion and contraction of the pipe.

The engagement members ensure the elongate members are retained in place. They also prevent relative twisting between the arcuate members, and particularly bearing in mind only a single bolt extends between each adjacent arcuate member. By using such an arrangement with only a single bolt, this reduces the weight of the clamping arrangement relative to prior arrangements, and thus reduces the buoyancy requirement.

Various modifications may be made without departing from the scope of the invention. For instance the clamping arrangement may be made up of more than three arcuate members. A different number of discrete resilient members may be provided on each arcuate member. Different materials could be used in some or all of the components of the arrangement and assembly.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A buoyancy clamp assembly, the clamp assembly including a clamping arrangement, which arrangement includes three or more profiled arcuate members engageable together to clamp onto a pipe, each of the arcuate members including a plurality of discrete resilient members on their inner faces which are deformably engageable against a pipe when the clamping arrangement is clamped onto the pipe, the discrete resilient members diverging in profile away from the arcuate members.

2. A buoyancy clamp assembly according to claim 1, in which each of the arcuate members is substantially identical to each other.

3. A buoyancy clamp assembly according to claim 1, in which the discrete resilient members diverge in profile in perpendicularly opposite directions, and diverge in both longitudinal and transverse direction.

4. A buoyancy clamp assembly according to claim 1, in which the discrete resilient members are elongate, and have an axial longitudinal direction.

5. A buoyancy clamp assembly according to claim 1, in which the discrete resilient members in a relaxed condition have a concave engagement face engageable with a pipe, and the discrete resilient members have a hollow part, which part is locatable adjacent a respective arcuate member.

6. A buoyancy clamp assembly according to claim 1, in which the discrete resilient members are made of any of natural rubber, neoprene or a resilient plastics material.

7. A buoyancy clamp assembly according to claim 1, in which three or more discrete resilient members are provided on each arcuate member.

8. A buoyancy clamp assembly according to claim 1, in which engagement members are provided extendable between adjacent arcuate members to prevent relative twisting of adjacent arcuate members.

9. A buoyancy clamp assembly, the clamp assembly including a clamping arrangement, which arrangement includes three or more profiled arcuate members engageable together to clamp onto a pipe, engagement members being provided extendable between adjacent arcuate members to prevent relative twisting of adjacent arcuate members, and discrete resilient members disposed on an inner face of the arcuate members, the discrete resilient members diverging in profile away from the arcuate members.

10. A buoyancy clamp assembly according to claim 9, in which the engagement members are configured to permit relative pivotal movement between adjacent arcuate members a pair of engagement parts, each engageable with a respective arcuate member, and are provided a link member extending between the engagement parts, the engagement parts having a circular profile, and rotatingly locate in respective circular profile openings in the arcuate members, and the engagement parts snap fit in the respective openings in the arcuate members.

11. A buoyancy clamp assembly according to claim 9, in which the engagement members are made of rubber, or a resilient plastics material, a pair of engagement members are provided and extend between each adjacent pair of arcuate member, and the engagement members are provided on opposite radial faces of the arcuate members.

12. A buoyancy clamp assembly according to claim 11, in which fastening assemblies are provided engageable between adjacent arcuate members, the assembly being configured such that when the arcuate members are brought into contact with each other by the respective fastening assemblies, sufficient compressive force will be applied by the discrete resilient members on to a pipe surrounded by the arcuate members to clamp the assembly onto the pipe, each fastening assembly includes an elongate member extending parallel to the axial direction in each arcuate member, with a fastening arrangement extendable between the elongate members on adjacent arcuate members, alignable holes are provided in the elongate members through which the fastening arrangement is extendable, and the fastening arrangement includes a threaded member, which threaded member includes a bolt, with a nut or nuts engageable therewith, the elongate members are rotatably located in passages extendable through the arcuate members, the passages at each end provide the openings which locate the engagement member engagement parts, the engagement member engagement parts are engageable with ends of the elongate members, and help to retain the elongate members in the passages.

13. A buoyancy clamp assembly according to claim 1, in which outwardly open recesses are provided in the outside of the arcuate members, which recesses locate respective fastening arrangements such that the fastening arrangements do not extend outwardly beyond the arcuate members, cover members are provided to close off the recesses, and the cover members snap fit on the openings to the recesses.

14. A buoyancy clamp assembly according to claim 1, in which the buoyancy clamp assembly includes a plurality of axially adjacent clamping arrangements.

15. A buoyancy clamp assembly according to claim 14, in which the clamping arrangements are radially offset relative to each other, and are offset by around 60°.

16. A buoyancy clamp assembly according to claim 14, in which the clamping arrangements are radially aligned, with respective fastening assemblies adjacent each other, and common fastening assembly elongate members may be provided which extend through adjacent arcuate members, such that each elongate member forms part of multiple adjacent fastening assemblies.

17. A buoyancy clamp assembly according to claim 1, in which the buoyancy clamp assembly also includes a buoyancy arrangement which is mountable on the clamping arrangement or arrangements.

18. A buoyancy clamp assembly according to claim 17, in which the buoyancy arrangement is profiled to receive and surround a respective clamping arrangement or arrangements, the buoyancy arrangement including a hollow member, the hollow member comprised of any of plastics material or nylon.

19. A buoyancy clamp assembly according to claim 17, in which a filling is provided in the hollow member, and the filling comprised any of a foamed material or syntactic foam.

20. A buoyancy clamp assembly according to claim 17, in which the buoyancy arrangement includes a plurality of hollow members engageable together around a clamping arrangement or arrangements, and a clamp member or members is/are provided which surrounds the hollow members.

* * * * *